Dec. 20, 1960

R. E. HULL ET AL 2,965,826

ELECTRICAL MOTOR CONTROL APPARATUS

Filed July 11, 1958

WITNESSES:
Bernard R. Gieguen
James F. Young

INVENTORS
Robert E. Hull and
John W. Wallace.
BY R.J.Brodahl
ATTORNEY

United States Patent Office 2,965,826
Patented Dec. 20, 1960

2,965,826

ELECTRICAL MOTOR CONTROL APPARATUS

Robert E. Hull, Amherst, and John W. Wallace, Orchard Park, N.Y., assignors to Westinghouse Electric Corporation, East Pittsburgh, Pa., a corporation of Pennsylvania Filed July 11, 1958, Ser. No. 748,053

8 Claims. (Cl. 318—158)

The present invention relates, in general, to electrical motor control apparatus, and more particularly, to electrical motor control apparatus including a motor operation controlling circuit arrangement wherein a predetermined motor operation error is sensed and a correction or compensation signal is provided in accordance with such predetermined motor operation error and utilized to correct or compensate for the predetermined error in the operation of the motor.

It is an object of the present invention to provide improved control apparatus for a motor or like device and including an error compensation circuit operative to provide a predetermined and substantially flat motor operating characteristic as may be desired.

It is a different object of the present invention to provide improved variable voltage motor control apparatus including a motor control signal voltage limiting circuit and a compensation circuit operative with the control signal voltage limiting circuit to compensate for a predetermined error voltage resulting from the operation of the voltage limiting circuit.

It is another object of the present invention to provide improved motor control apparatus including a motor operation limiting circuit operative with the motor and providing a motor control signal in accordance with a predetermined operation of said limiting circuit for further limiting the operation of said motor.

It is an additional object of the present invention to provide improved motor control apparatus including a motor armature current limiting circuit operative with said motor and providing a motor control signal in accordance with a predetermined operation of said current limiting circuit for further limiting said motor armature current.

These and other objects and advantages of the present invention will become still more apparent from a study of the following description taken in conjunction with the drawings, wherein.

In general, signal voltage limiter circuits are frequently used in conjunction with current limit type regulator circuits to permit sharp current limiting characteristics of a motor armature current or the like and still allow the current limit regulator circuit loop gain characteristic to be relatively low to afford the desired stability of the loop circuit.

Figure 1:
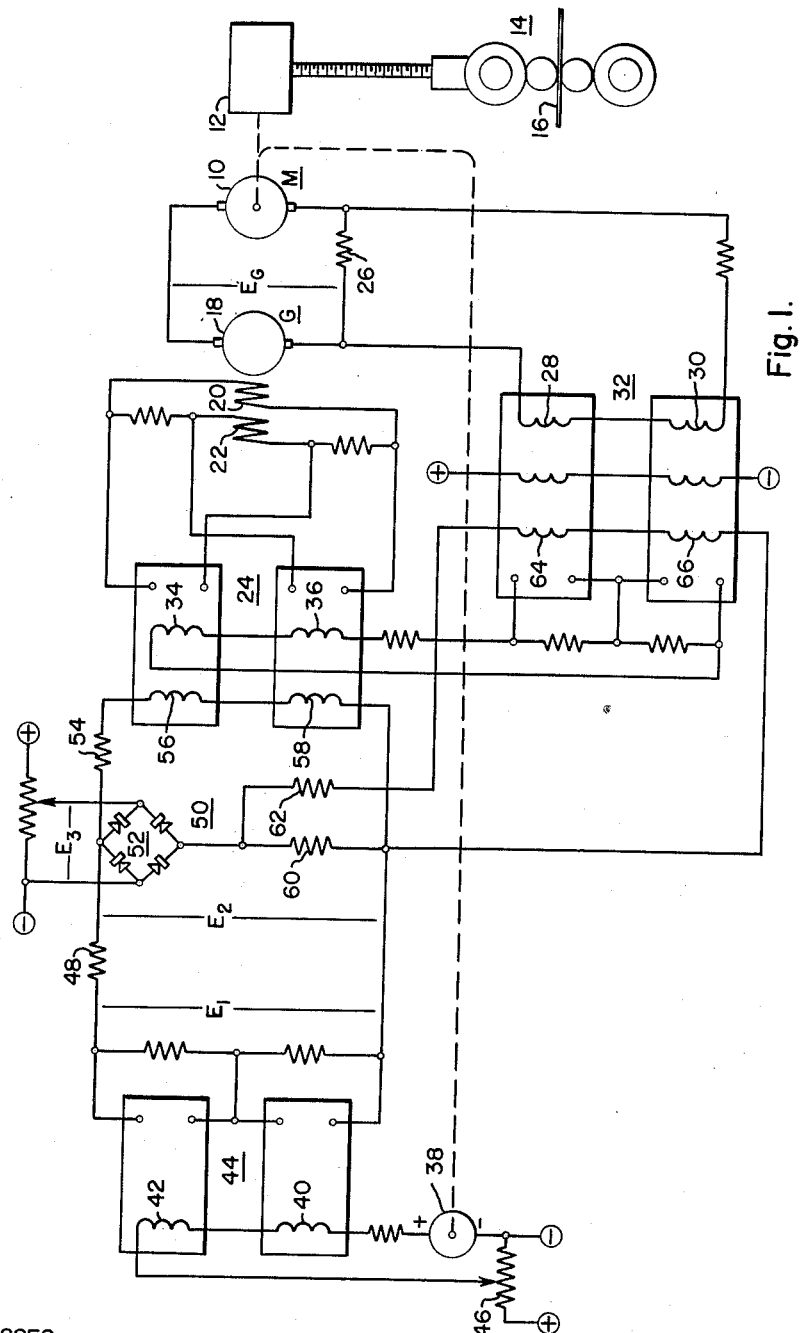
Figure 1 is a schematic circuit arrangement of the control apparatus in accordance with the teachings of the present invention.

More specifically, in Fig. 1, there is shown a motor 10 operative with a screwdown control device 12 for a rolling mill 14 operative with a strip of material 16. A variable voltage control circuit is provided for the motor 10 and includes the voltage supply generator 18 having a first field winding 20 and a second field winding 22 which are connected in a conventional magnetic amplifier type circuit arrangement, with a motor controlling magnetic amplifier device 24, such that the output voltage of the generator 18 can be reversed as desired and varied in value as may be desired for supplying current to the armature circuit of the motor 10 and thereby for controlling the operative speed and the direction of operation of the motor 10. In the motor armature circuit of the motor 10 there is provided an impedance device 26 operative to provide a control signal that is proportional to the armature current of the motor 10 and supply it to control windings 28 and 30 of a current limiting magnetic amplifier device 32. The output of the current limiting magnetic amplifier device 32 is connected through control windings 34 and 36 of the motor control magnetic amplifier device 24 for limiting in a predetermined manner and thereby controlling the value of the armature current of the motor 10 in accordance with the actual value of the motor armature current as sensed by the impedance device 26.

The screwdown motor 10 is mechanically connected to a tachometer generator device 38 for providing an output signal having a value proportional to the operating speed of the screwdown motor 10. The output speed control signal from the tachometer generator 38 is applied to control windings 40 and 42 of an input magnetic amplifier device 44 through a predetermined bucking reference voltage from across a potentiometer device 46 such that the difference between the output voltage of the tachometer generator 38 and the voltage drop across the impedance member 46 is applied to energize the control windings 40 and 42 of the input magnetic amplifier device 44. The output signal from the input magnetic amplifier device 44 and corresponding to the voltage $E_1$ as shown in Fig. 1, is applied through the dropping resistor 48 such that a speed control signal $E_2$ is applied across the limiting circuit 50 including the full-wave rectifier bridge circuit 52 having a reference voltage $E_3$ applied across said bridge circuit 52 in a bucking or opposition relationship relative to the speed signal $E_2$. Whenever the speed signal $E_2$ is smaller than the reference voltage $E_3$, the signal $E_2$ in its entirety is applied through the impedance member 54 to the control windings 56 and 58 of the motor control magnetic amplifier device 24. However, the limiting circuit 50 including the impedance member 60 is operative as a conductive or shunt path for the portion of the speed signal $E_2$ greater than the opposing reference voltage $E_3$.

The control signal drop as represented by the voltage drop across the shunt path impedance member 60 is applied through the impedance member 62 to the control windings 64 and 66 of the current limiting magnetic amplifier device 32 and of such a polarity as to further decrease the energization of the generator field windings 20 and 22 by an amount proportional to the control signal drop across the shunt impedance member 60.

Figure 2:
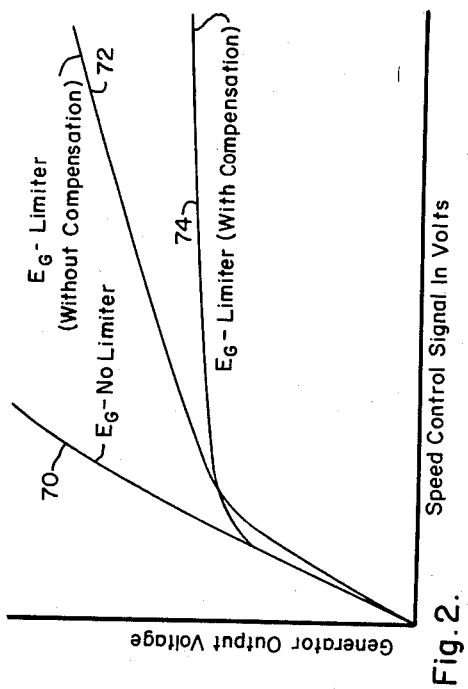
Fig. 2 is a curve chart illustrating the operation of the control apparatus in accordance with the present invention.

In Fig. 2 there is shown a curve chart showing a plot of the output voltage of the generator 18 as a function of the speed control signal $E_1$ in volts. The first curve 70 shows the output voltage characteristic $E_g$ of the generator 18 when the limiter circuit 50 as shown in Fig. 1 is not included and thusly is not operative. The curve 72 is a plot of the output voltage characteristic $E_g$ of the generator 18, with the limiting circuit 50 in operation but not including the compensation provided by the voltage drop signal from across the impedance member 60. The curve 74 is a plot of the output voltage characteristic $E_g$ of the generator 18, with the limiter circuit 50 in operation and in addition with the control signal drop across the impedance member 60 being applied to the control windings 64 and 66 of the current limiting magnetic amplifier device 32.

Figure 3:
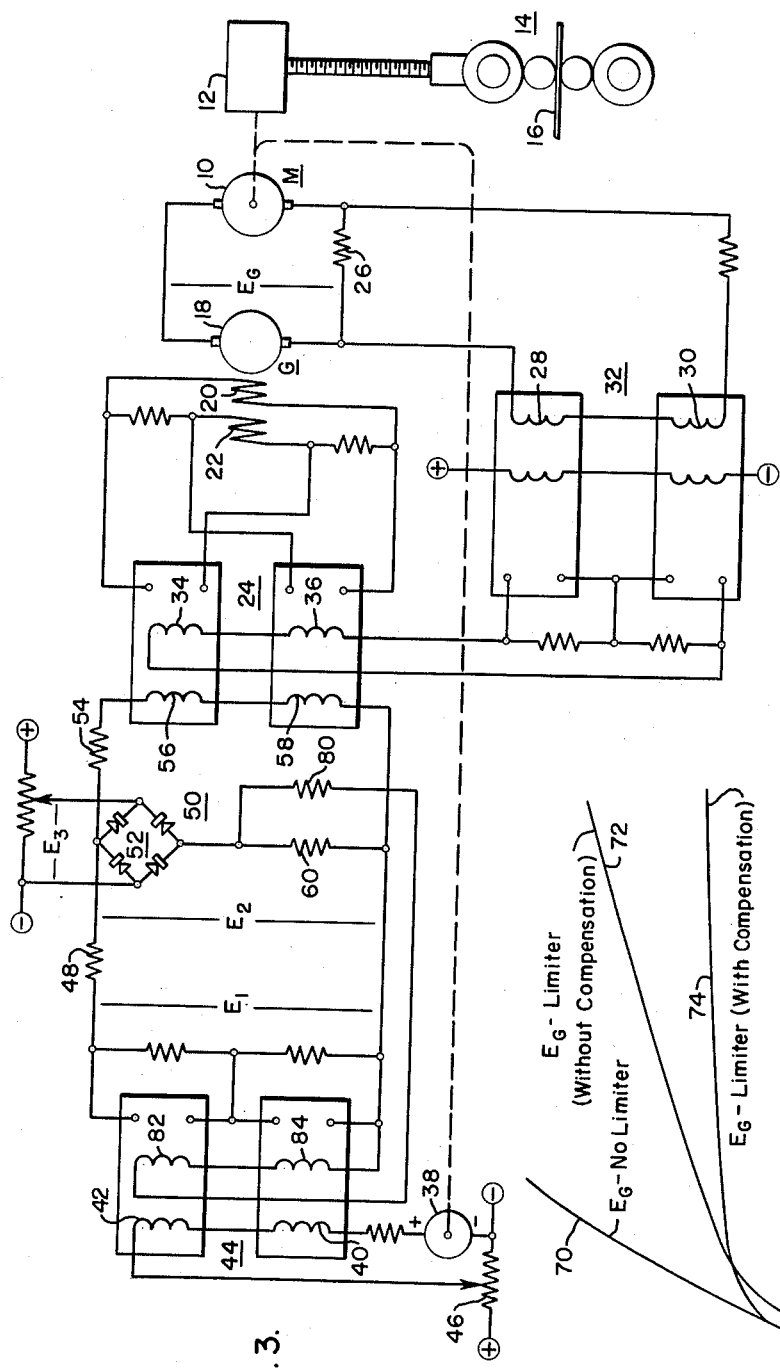
Fig. 3 is a schematic diagram illustrating a modification of the present control apparatus.

In Fig. 3 there is shown a modification of the control apparatus in accordance with the present invention wherein the control signal drop across the serially connected impedance member 60 is applied through an impedance member 80 to control windings 82 and 84 of the speed control input magnetic amplifier device 44 in a feedback opposition or negative feedback relationship such that an increase in the control signal drop across the impedance member 60 results in a decrease in the value of the control signal $E_1$ and therefore a decrease in the value of the control signal $E_2$ applied to the limiter circuit 50 and finally to the motor control magnetic amplifier 24.

Thusly, there is shown in Fig. 1, a speed regulating circuit arrangement using a current limit magnetic amplifier device 32 which is connected in a push-pull circuit arrangement and biased into a cutoff condition such that the current flowing in the control windings 28 and 30 of the magnetic amplifier device 32 must reach a certain prescribed value before the current limit magnetic amplifier device 32 comes out of this cutoff operating condition and begins to produce a current limiting control signal in the control windings 34 and 36 of the motor control magnetic amplifier device 24. For stability reasons, the operating gain of the current control loop including the magnetic amplifier device 32 in practice may be required to be rather low and therefore the motor armature current can rise appreciably after the current limiting action as controlled by the magnetic amplifier device 32 becomes effective. Thusly, the current limiting regulator apparatus as shown in Fig. 1 operates to produce ampere turns in the control windings 34 and 36 of the motor control magnetic amplifier device 24 in a direction to reduce the output voltage of the generator 18 when the armature current of the motor 10 tends to rise above a predetermined value, at which the current limiting operation begins by the provision of an output signal from the current limiting magnetic amplifier device 32. When the output voltage of the generator 18 is thereby reduced, the motor 10 tends to decrease its operating speed. However, the speed regulating circuit arrangement including the tachometer generator 38 and the speed control magnetic amplifier device 44 then becomes operative to maintain the operating speed of the motor 10 by causing the control signal $E_1$ and thereby the control signal $E_2$, as shown in Fig. 1, to rise in value to effectively increase the ampere turns of the control windings 56 and 58 of the motor control magnetic amplifier device 24 to thereby try to keep the output voltage of the generator 18 from decreasing in value and thereby to prevent the reduction of the operating speed of the motor 10.

In order to limit the value of the armature current of the motor 10, it can be seen that the current limit control signal from the regulator circuit including the magnetic amplifier device 32 must override the speed regulating control signal from the speed regulating circuit including the tachometer generator 38 and the speed control magnetic amplifier device 44. With the gain characteristic of the current limiting regulator circuit including the magnetic amplifier device 32 being limited for stability reasons, the sharpness of the resultant current limiting action may become inadequate to override the higher gain speed regulating control circuit including the speed control magnetic amplifier device 44. Thusly, the signal voltage limiting circuit 50 operative to limit effectively the voltage value of the speed control signal $E_2$ is provided to effectively prevent the speed control signal $E_2$ from rising above a predetermined value.

The operation of the signal voltage limiting circuit 50 is such that the voltage value of the speed control signal $E_2$ is effectively limited by means of a biased rectifier circuit including the rectifier bridge 52. In general, the impedance value of the shunt impedance member 60 is smaller than the impedance value of either of the impedance members 48 and 54 such that when the voltage of the speed control signal $E_2$ exceeds the value of the reference or bias voltage $E_3$, current will flow through the rectifier bridge 52 and the shunt impedance member 60. Because the voltage drop of the shunt circuit including the rectifier bridge 52 and the shunt impedance member 60 is relatively small compared to the voltage drop across the impedance member 48, the impedance member 48 will effectively absorb most of the voltage rise that occurs when the output voltage $E_1$ of the speed control magnetic amplifier device 44 increases to thereby result in a relatively small increase in the voltage value of the speed control signal $E_2$. Thusly, the current limit regulator circuit including the magnetic amplifier device 32 is more effective in practice and the sharpness of the current limiting action provided by the current limiting regulating circuit including the magnetic amplifier device 32 is thereby improved.

However, a further improvement can be realized by using the current signal or voltage drop across the shunt impedance member 60 as an error compensation signal supplied to the control windings 64 and 66 of the current limit magnetic amplifier device 32, such that when the signal voltage limiter circuit 50 begins to operate and begins to effectively reduce or limit the value of the speed control signal $E_2$, a control signal or voltage drop will thereby result across the shunt impedance member 60 which is proportional to the amount that the voltage of the speed control signal $E_2$ exceeds the reference or bias voltage $E_3$. This control signal or voltage drop across the shunt impedance member 60 is operative to produce ampere turns in the compensation or control windings 64 and 66 of the current limit magnetic amplifier device 32. When this compensation circuit is correctly calibrated and as can be readily predetermined, the current limit magnetic amplifier device 32 will increase the energization of the control windings 34 and 36 and substantially cancel the increasing ampere turns in the control windings 56 and 58 due to the increasing voltage value of the speed control signal $E_2$ due to the voltage drop across the impedance member 60. This is done by the current limit magnetic amplifier device 32 energizing the control windings 34 and 36 by a substantially equivalent amount but in opposition to the energization of the control windings 56 and 58 due to the voltage difference of the speed control signal $E_2$ relative to the reference control signal $E_3$. The output energization by the motor control magnetic amplifier device 24 thusly will substantially not change and in this manner excellent current limiting action can be obtained relative to the armature current of the motor 10.

The circuit arrangement as shown in Fig. 1 is particularly useful for starting motors under current limit control conditions, and it is also useful for improving the current limit operation of a motor under conditions of load disturbance.

In Fig. 3 there is shown a modification of the apparatus in accordance with the present invention wherein the compensation signal from across the shunt impedance member 60 is applied as a negative feedback signal to the control windings 82 and 84 and in opposition to the control windings 42 and 40 of the speed control magnetic amplifier device 44. This compensating signal is provided as a feedback signal only after the signal voltage limiter circuit 50 begins to function and when the speed control signal $E_2$ exceeds the reference or bias control signal $E_3$. The action of the negative feedback circuit arrangement as shown in Fig. 2 is such that the speed control signal $E_2$ is substantially prevented from exceeding the predetermined limit value as determined by the reference or bias voltage $E_3$.

It should be here noted that the present application is related to a copending patent application Serial No. 662,425, filed May 29, 1957, by the same inventors entitled "Strip Thickness Control Apparatus" and assigned to the same assignee as is the present application.

Although the present invention has been described with a certain degree of particularity, it should be understood that the present disclosure has been made only by way of example and that numerous changes in the details of construction and the combination and arrangement of parts may be resorted to without departing from the scope and spirit of the present invention.

We claim as our invention:

1. In control apparatus for a motor having an armature, the combination of a first control means responsive to a predetermined motor operating parameter for providing a control signal and operatively connected to said motor armature for controlling the armature current of said motor in accordance with said control signal, a signal value limiting circuit operatively connected to said first control means for limiting said control signal to a predetermined value, said limiting circuit including an impedance member responsive to the portion of said control signal provided by said first control means greater than said predetermined value, and second motor control means responsive to the signal portion drop of said control signal across said limiting circuit impedance member and operatively connected to said first control means for controlling said motor armature current in accordance with said control signal portion drop.

2. In control apparatus for a motor having an armature, the combination of first current control means responsive to a predetermined motor operating parameter and operatively connected to said motor armature for providing a first control signal in accordance with said predetermined motor operating parameter, a signal limiting circuit operatively connected to said first control means for limiting said first control signal to a predetermined value, and second current control means including a control member responsive to a predetermined operation of said signal limiting circuit for providing a second control signal in accordance with the portion of said first control signal as provided by said first current control means that is different than said predetermined value, with said second current control means being operatively connected to said motor armature for controlling the armature current of said motor in accordance with said second control signal.

3. In control apparatus for a motor having an armature member, said control apparatus including a generator having a control field winding member and being connected to energize said motor armature member, the combination of a first motor control means responsive to a predetermined motor operating parameter for providing a first control signal and being operatively connected to one of said motor armature member and said field winding member for controlling the energization of said one member in accordance with said first control signal, a signal limiting circuit operatively connected to said first motor control means for limiting said first control signal to a predetermined value, said limiting circuit including a signal difference responsive member that is responsive to the difference between said first control signal provided by said first control means and said predetermined value, and second motor control means operative with said signal difference responsive member and responsive to a predetermined operation of said signal limiting circuit for providing a second control signal in accordance with the latter said predetermined operation, with said second motor control means being operatively connected to said one member for controlling the energization of said one member in accordance with said second control signal.

4. In control apparatus for a motor having an armature member, said control apparatus including a generator having a control field winding member and being connected to energize said motor armature member, the combination of a first motor speed control means responsive to the operating speed of said motor for providing a first control signal and being operatively connected to one of said motor armature member and said field winding member for controlling the energization of said one member in accordance with said first control signal, a signal limiting circuit operatively connected to said first motor speed control means for limiting said first control signal to a predetermined value, and second motor speed control means responsive to a predetermined operation of said signal limiting circuit for providing a second control signal in accordance with the latter said predetermined operation, with said second motor speed control means being operatively connected to said one member for controlling the energization of said one member in accordance with said second control signal, and third motor speed control means responsive to the armature current of said motor and operatively connected to said one member for controlling the energization of said one member in accordance with said motor armature current.

5. In control apparatus for a motor having an armature, the combination of first motor control means including a first signal amplifier device responsive to a predetermined motor operating parameter for providing a first control signal and being operatively connected to said motor armature for controlling the armature current of said motor in accordance with said first control signal, a signal limiting circuit including a reference voltage source and a signal conductive circuit operatively connected to said first control means such that said first control signal is connected in opposition to said reference voltage source and through said signal conductive circuit for limiting said first control signal to a predetermined value as determined by said reference voltage, and second motor control means responsive to the drop of said control signal across said signal conductive circuit and being operatively connected to said first control means for controlling said motor armature current in accordance with said control signal drop across said signal conductive circuit.

6. In control apparatus for a motor having an armature, the combination of first motor control means including a first magnetic amplifier device and being responsive to a predetermined motor operating parameter for providing a control signal, said first magnetic amplifier device being responsive to said control signal and operatively connected to said motor armature for controlling the armature current of said motor in accordance with said control signal, a signal limiting circuit operatively connected to said first control means for limiting said control signal to a predetermined value, and second motor control means including a second magnetic amplifier device having a control winding responsive to the drop of said control signal across said signal limiting circuit, with said second magnetic amplifier device being operatively connected to said first magnetic amplifier device for controlling the motor armature current in accordance with said control signal drop.

7. In control apparatus for a motor having an armature, the combination of a first motor control means responsive to a predetermined motor operating parameter for providing a control signal in accordance with said parameter and being operatively connected to said motor armature for controlling the armature current of said motor in accordance with said control signal, a signal limiting circuit including an impedance member and being operatively connected to said first current control means for limiting said control signal to a predetermined value, and second motor control means responsive to the drop of said control signal across said impedance member and being operatively connected to said first motor control means for controlling said motor armature current in accordance with said control signal drop.

8. In control apparatus for a motor having an armature, the combination of first motor control means responsive to a predetermined motor operating parameter for providing a first motor control signal in accordance with said parameter and being operatively connected to said motor armature for controlling the armature current of said motor in accordance with said first motor control signal, a signal limiting circuit including an impedance member and being operatively connected to said first control means for responding to said first control signal and limiting said motor armature current to a predetermined value, and second motor control means responsive to the drop of said first control signal across said impedance member for providing a second control signal in accordance with the drop of said first control signal across said impedance member, with said second motor control means being operatively connected to said motor armature for controlling the armature current of said motor in accordance with said second control signal.

References Cited in the file of this patent

UNITED STATES PATENTS

| | | |
|---|---|---|
| 2,504,105 | Bendz | Apr. 18, 1950 |
| 2,753,516 | Halter et al. | July 3, 1956 |